US010904542B2

(12) United States Patent
Huang et al.

(10) Patent No.: US 10,904,542 B2
(45) Date of Patent: Jan. 26, 2021

(54) IMAGE TRANSCODING METHOD AND APPARATUS

(71) Applicant: Tencent Technology (Shenzhen) Company Limited, Shenzhen (CN)

(72) Inventors: Xiaozheng Huang, Shenzhen (CN); Shitao Wang, Shenzhen (CN); Binji Luo, Shenzhen (CN); Haijun Liu, Shenzhen (CN); Piao Ding, Shenzhen (CN); Xinxing Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/504,764

(22) Filed: Jul. 8, 2019

(65) Prior Publication Data

US 2019/0335186 A1 Oct. 31, 2019

Related U.S. Application Data

(63) Continuation of application No. PCT/CN2018/079443, filed on Mar. 19, 2018.

(30) Foreign Application Priority Data

Apr. 27, 2017 (CN) .......................... 2017 1 0299885

(51) Int. Cl.
*H04N 19/40* (2014.01)
*H04N 19/126* (2014.01)
(Continued)

(52) U.S. Cl.
CPC ........... *H04N 19/40* (2014.11); *H04N 19/126* (2014.11); *H04N 19/132* (2014.11); *H04N 19/134* (2014.11); *H04N 19/176* (2014.11)

(58) Field of Classification Search
CPC .. H04N 19/132; H04N 19/154; H04N 19/176; H04N 19/134; H04N 19/126; H04N 19/172; H04N 19/40; G06T 9/00
See application file for complete search history.

(56) References Cited

U.S. PATENT DOCUMENTS

2001/0010707 A1 8/2001 Matsumura et al.
2003/0095594 A1* 5/2003 Laksono .............. H04N 19/126 375/240.03

(Continued)

FOREIGN PATENT DOCUMENTS

CN 1695352 A 11/2005
CN 101842811 A 9/2010

(Continued)

OTHER PUBLICATIONS

Tencent Technology, WO, PCT/CN2018/079443, dated Jun. 11, 2018, 5 pgs.

(Continued)

*Primary Examiner* — Neil R Mikeska
(74) *Attorney, Agent, or Firm* — Morgan, Lewis & Bockius LLP

(57) ABSTRACT

Embodiments of this application disclose an image transcoding method performed at a computing device. The image transcoding method includes: obtaining a source image quality parameter of a source image, the source image being a to-be-transcoded image, and the source image quality parameter being associated with a source image format and used for indicating image quality of the source image; obtaining, according to the source image quality parameter and a preset mapping relationship, a target image quality parameter that is associated with a target image format and that corresponds to the source image quality parameter of the source image; and transcoding the source image in the (Continued)

source image format according to the target image quality parameter to obtain a target image in the target image format.

18 Claims, 6 Drawing Sheets

(51) Int. Cl.
*H04N 19/132* (2014.01)
*H04N 19/134* (2014.01)
*H04N 19/176* (2014.01)

(56) References Cited

U.S. PATENT DOCUMENTS

2010/0045794 A1* 2/2010 Fernandez Carnero ..................... G06T 1/0071 348/143
2012/0206610 A1* 8/2012 Wang ................... H04N 17/004 348/184
2013/0156310 A1 6/2013 Yao et al.

FOREIGN PATENT DOCUMENTS

| | | | |
|---|---|---|---|
| CN | 102917157 | A | 2/2013 |
| CN | 105187835 | A | 12/2015 |
| CN | 105791849 | A | 7/2016 |
| CN | 106611432 | A | 5/2017 |
| TW | 200908747 | A | 2/2009 |

OTHER PUBLICATIONS

Tencent Technology, IPRP, PCT/CN2018/079443, dated Oct. 29, 2019, 6 pgs.
Tencent Technology, ISR, PCT/CN2018/079443, dated Jun. 11, 2018, 2 pgs.

* cited by examiner

IMAGE TRANSCODING METHOD AND APPARATUS

CROSS-REFERENCE TO RELATED APPLICATIONS

This application is a continuation application of PCT/CN2018/079443, entitled "IMAGE TRANSCODING METHOD AND APPARATUS" filed on Mar. 19, 2018, which claims priority to Chinese Patent Application No. 201710299885.3, entitled "IMAGE TRANSCODING METHOD AND APPARATUS" filed with the Chinese Patent Office on Apr. 27, 2017, all of which are incorporated by reference in their entirety.

FIELD OF THE TECHNOLOGY

This application relates to the field of image processing, and in particular, to an image transcoding method and apparatus.

BACKGROUND OF THE DISCLOSURE

Technologies for image formats such as Joint Photographic Experts Group (JPEG) that are commonly used at present arose in relatively early ages, and generally, compression efficiency is relatively low. Lots of existing images have been stored in the image format such as the JPEG. In the Internet era, storage and transmission of massive image files consume heavy storage and bandwidth costs. A common method is transcoding an original image format into an image format having higher compression efficiency for transmission and storage. The transcoding means converting a compressed original image into another image format.

SUMMARY

Embodiments of this application provide an image transcoding method and apparatus, to avoid a waste of a storage resource or a network transmission resource that is caused by a very large data volume of a transcoded image file due to that a relatively high quality configuration is used.

According to a first aspect of this application, an embodiment of this application provides an image transcoding method performed at a computing device having one or more processors and memory storing a plurality of programs to be executed by the one or more processors, the method comprising:

obtaining a source image quality parameter of a source image, the source image being a to-be-transcoded image, and the source image quality parameter being associated with a source image format and used for indicating image quality of the source image;

obtaining, according to the source image quality parameter and a preset mapping relationship, a target image quality parameter that is associated with a target image format and that corresponds to the source image quality parameter of the source image; and transcoding the source image in the source image format according to the target image quality parameter to obtain a target image in the target image format.

According to a second aspect of this application, an embodiment of this application provides a computing device comprising one or more processors, memory coupled to the one or more processors and a plurality of programs stored in the memory that, when executed by the one or more processors, cause the computing device to perform the aforementioned image transcoding method.

According to a third aspect of this application, an embodiment of this application provides a non-transitory computer readable storage medium storing a plurality of machine readable instructions in connection with a computing device having one or more processors. The plurality of machine readable instructions, when executed by the one or more processors, cause the terminal to perform the aforementioned image transcoding method.

In the embodiments of this application, a corresponding quality configuration is dynamically used according to the quality parameter of the source image for image transcoding, to avoid a waste of a storage resource or a network transmission resource that is caused by a very large data volume of a transcoded image file due to that a relatively high quality configuration is used.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some embodiments of this application rather than all embodiments. All other embodiments obtained by a person of ordinary skill in the art based on the embodiments of this application without creative efforts shall fall within the protection scope of this application.

An image transcoding method in the embodiments of this application can be implemented in various types of personal terminals or network background servers to perform image transcoding processing on an existing image. Descriptions are provided below by using an image transcoding apparatus as an execution body. The personal terminal may be, for example, a personal computer, a notebook computer, a tablet computer, an e-reader, a smartphone, or an intelligent wearable device. The network background server may be a website server, a cloud storage server, an image management server, an instant messaging server, a social application server, or the like. The image transcoding method provided in this application is applicable to any scenario, provided that an image needs to be stored or transmitted in the scenario.

Figure 1:
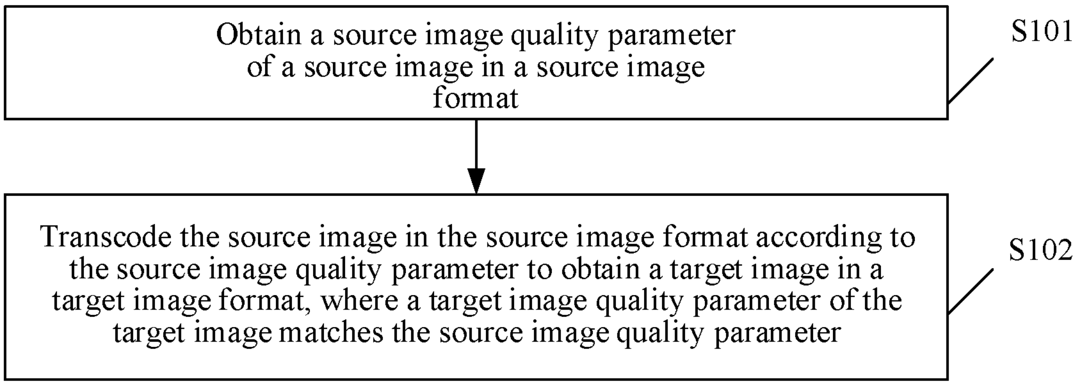
FIG. 1 is a schematic flowchart of implementation of an image transcoding method according to an embodiment of this application.

FIG. 1 is a schematic flowchart of implementation of an image transcoding method according to an embodiment of this application. As shown in the figure, a procedure of the image transcoding method in this embodiment may include the following steps:

S101. Obtain a source image quality parameter of a source image.

In some embodiments, the source image is an image needing to be transcoded. The source image quality parameter indicates image quality of the source image. The image quality may refer to whether an image is good or a distortion degree of the image, and usually can reflect evaluation of people on an image in terms of visual perception. The evaluation may include subjective evaluation and objective evaluation. The subjective evaluation means that an evaluator directly scores image quality of a to-be-evaluated image subjectively. The objective evaluation means digitizing an image and calculating an image quality score of an image by using a machine algorithm. In addition, the image quality evaluation may further be classified into image quality evaluation having a reference and image quality evaluation having no reference. The image quality evaluation having a reference usually refers to evaluation of an error level of a tested image (namely, a target image) relative to a standard image (namely, an original image), and the image quality evaluation having no reference is an evaluation manner specific only to an image. A common image quality evaluation algorithm may include: a structural similarity index measurement (SSIM) algorithm, a mean square error (MSE) algorithm, an information fidelity criterion (IFC) algorithm, a visual information fidelity (VIF) algorithm, and the like.

An image transcoding apparatus may obtain the source image quality parameter of the source image in the foregoing manner, or may receive a result of the source image quality parameter from another device or in another manner, for example, receive the source image quality parameter of the source image through manual entering or from a third device or a network server.

In some embodiments, the image transcoding apparatus may obtain a quantization matrix of the source image, and then compare the quantization matrix of the source image with a preset standard quantization matrix, to obtain the source image quality parameter of the source image. In a specific implementation, the image transcoding apparatus may obtain a value of a coefficient of variation between the quantization matrix of the source image and the standard quantization matrix according to a ratio of each coefficient in the quantization matrix of the source image to a coefficient at a corresponding location in the preset standard quantization matrix, and then normalize the value of the coefficient of variation according to a preset normalization algorithm to obtain the source image quality parameter (where for example, the source image quality parameter obtained through normalization is a value ranging from 0 to 100). The manner can be applicable to obtaining a source image quality parameter of a source image in an image format such as JPEG. An implementation process of the manner is specifically described below with reference to FIG.

In another implementation, the image transcoding apparatus may obtain a quantization parameter (QP) of each pixel macroblock in the source image, to obtain the source image quality parameter of the source image. Specifically, the implementation may include: obtaining an image QP of the source image according to the QP of each pixel macroblock in the source image, and then determining the source image quality parameter according to the image QP of the source image (where like the source image quality parameter obtained through normalization, the source image quality parameter may be, for example, a value ranging from 0 to 100). The manner can be applicable to obtaining a source image quality parameter of a source image in an image format such as WebP (an image format developed by Google to improve an image upload speed). An implementation process of the manner is specifically described below with reference to FIG. 6.

S102. Transcode the source image in a source image format according to the source image quality parameter to obtain a target image in a target image format, where a target image quality parameter of the target image matches the source image quality parameter. In some embodiments, the source image format is different from the target image format. For example, the source image format is JPEG and the target image format is BPG.

To be specific, a quality parameter configuration used by the image transcoding apparatus to transcode the source image should match the quality parameter of the source image. The "match" herein may be "the same", that is, the target image quality parameter of the target image format is the same as the source image quality parameter of the source image; or may be "a mapping relationship in which the quality parameters are different", for example, a mapping formula for calculating the quality parameter of the target image format according to the quality parameter of the source image. The target image quality parameter of the target image may also be used for indicating image quality of the target image, for example, may be a QP of the target image. A smaller QP indicates higher image quality of the target image.

In some embodiments, that the image transcoding apparatus transcodes the source image according to the source image quality parameter to obtain a target image in a target image format, where a target image quality parameter of the target image matches the source image quality parameter may include:

(1) The image transcoding apparatus obtains, according to a mapping relationship between a quality parameter of a source image format and a quality parameter of a target image format, the target image quality parameter that is associated with the target image format and that corresponds to the source image quality parameter of the source image.

In a specific implementation, the mapping relationship between the quality parameter of the source image format and the quality parameter of the target image format may include a correspondence between at least one quality parameter sample value of the source image format and a quality parameter that is associated with the target image format and that corresponds to each quality parameter sample value of the source image format.

The image transcoding apparatus may traverse each of the at least one quality parameter sample value of the source image format, use each quality parameter sample value as a target quality sample value, and respectively transcode a source image of the target quality parameter sample value by using a plurality of different transcoding quality parameters, to obtain a plurality of transcoded images that is in the target image format and that corresponds to the plurality of different transcoding quality parameters. Next, the image transcoding apparatus compares each transcoded image with the source image of the target quality parameter sample value, selects, from the plurality of transcoded images, a transcoded image whose image quality satisfies a preset quality requirement and image data volume is minimum, and uses a transcoding quality parameter corresponding to the transcoded image whose image quality satisfies the preset quality requirement and image data volume is minimum as a quality parameter that is associated with the target image format and that corresponds to the target quality parameter sample value. The foregoing sample transcoding and quality selection process is performed for each of the at least one quality parameter sample value of the source image format, so that the image transcoding apparatus can obtain the quality parameter that is associated with the target image format and that corresponds to each quality parameter sample value.

Next, when needing to transcode the source image, the image transcoding apparatus may search the mapping relationship between the quality parameter of the source image format and the quality parameter of the target image format for a quality parameter sample value most approximate to the source image quality parameter of the source image, and use a quality parameter that is associated with the target image format and that corresponds to the quality parameter sample value as the target image quality parameter that is associated with the target image format and that corresponds to the source image quality parameter of the source image.

In some other embodiments, the mapping relationship between the quality parameter of the source image format and the quality parameter of the target image format includes a mapping formula used for calculating the quality parameter of the target image format according to the quality parameter of the source image format. In a specific implementation, the image transcoding apparatus may train the mapping formula by using quality parameters of a plurality of transcoded images in the target image format and source image quality parameters that are of source images and that correspond to the quality parameters as training parameters, so that the trained mapping formula is approximate to a correspondence between the quality parameters of the plurality of transcoded images and the source image quality parameters that are of the source images and that correspond to the quality parameters.

(2) The image transcoding apparatus transcodes the source image according to the target image quality parameter to obtain the target image in the target image format.

Figure 3:
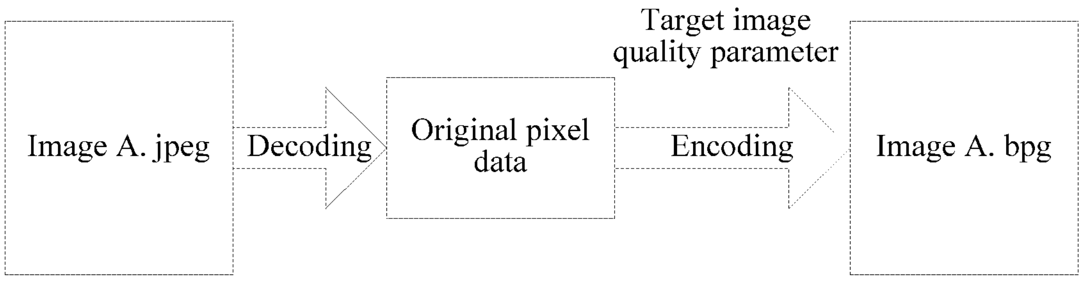
FIG. 3 is a schematic diagram of an image transcoding process according to an embodiment of this application.

As shown in FIG. 3, that the image transcoding apparatus transcodes the source image according to the target image quality parameter to obtain the target image in the target image format in (2) may further include:

(1) decoding the source image into original pixel data, for example, into RGB original pixel data, where if the source image is in a JPEG format, JPEG image data is decoded into the RGB original pixel data; and (2) re-encoding the original pixel data according to the target image quality parameter to obtain the target image in the target image format.

For example, the target image format is BPG, BPG image encoding is performed according to the original pixel data obtained through decoding, and an encoding quality configuration of a BPG image is determined according to the target image quality parameter. For example, if the determined target image quality parameter is DQP=40, the BPG image encoding may be performed on the original pixel data according to the QP=40.

As concluded through lots of experiments, there are the following three rules in an image transcoding process:

(1) When an image is to be transcoded into a target image format, if compression efficiency of the target image format is higher, the image file can be compressed to be smaller in the same quality condition.

(2) When quality is configured for image compression, higher configured quality indicates more reserved information of a source image and a larger file size.

(3) According to a characteristic of lossy compression of an image, quality of a transcoded image is lower than image quality in a source image format.

If the source image is also in an image format of lossy compression, it indicates that original pixel information collected by a camera that is reserved in the source image has been lost due to the lossy compression, and the source image is distorted to some extent. When a quality configuration of the target image format is set not to match the source image, for example, a quality configuration of the source image is very low and a quality configuration of the target image is relatively high, according to that (3) quality of the target image is lower than that of the source image and (2) relatively much unnecessary distorted information is reserved in the target image, file data of the target image is redundant, causing a waste of a data storage resource or a network transmission resource. In this case, although the compression efficiency of the target image format is higher, the effect in (1) may not be achieved. Otherwise, if the quality configuration of the source image is very high and the quality configuration of the target image is relatively low, more pixel content is lost after transcoding, causing more distortion. Therefore, an optimal manner is performing image transcoding by using a quality configuration matching the quality parameter of the source image, to reserve pixel content as much as possible, and avoid the waste of the storage resource or the network transmission resource that is caused by data redundancy.

In this embodiment of this application, a corresponding quality configuration is used according to the quality parameter of the source image for image transcoding, to avoid a waste of a storage resource or a network transmission resource that is caused by redundancy of a data volume of a transcoded image file due to that a relatively high quality configuration is used for the target image when the quality configuration of the source image is relatively low.

Figure 4:
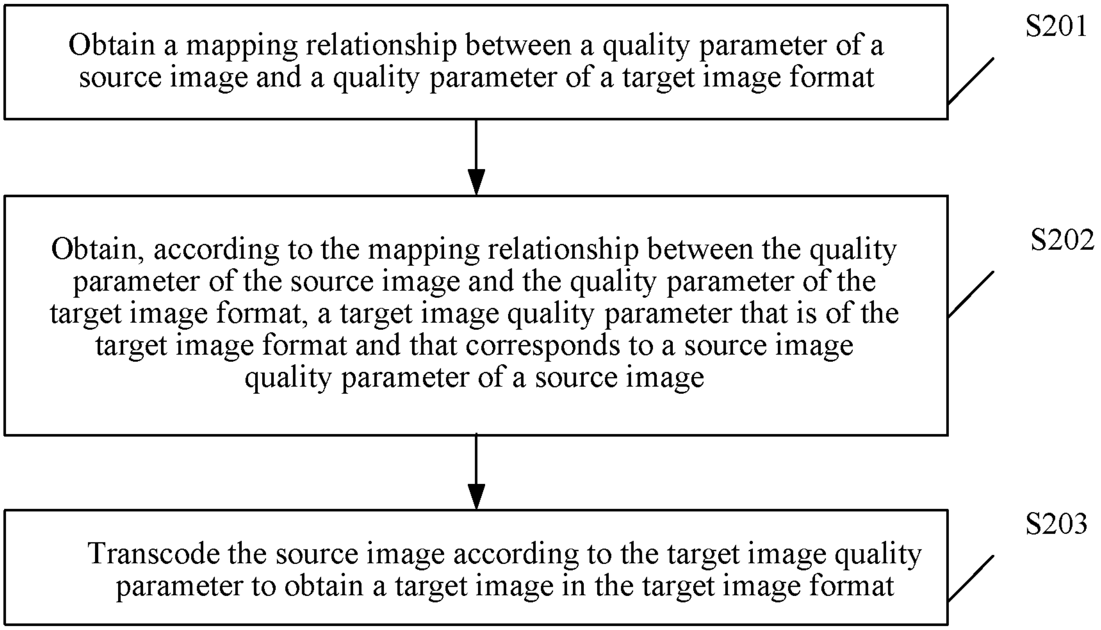
FIG. 4 is a schematic flowchart of implementation of an image transcoding method according to another embodiment of this application.

FIG. 4 is a schematic flowchart of implementation of an image transcoding method according to another embodiment of this application. As shown in the figure, a procedure of the image transcoding method in this embodiment includes the following steps:

S201. Obtain a mapping relationship between a quality parameter of a source image format and a quality parameter of a target image format.

In some embodiments, the mapping relationship between the quality parameter of the source image format and the quality parameter of the target image format may include a correspondence between at least one quality parameter sample value of the source image format and a quality parameter that is associated with the target image format and that corresponds to each quality parameter sample value of the source image format.

An image transcoding apparatus may traverse each of the at least one quality parameter sample value of the source image format, use each quality parameter sample value as a target quality sample value, and respectively transcode a source image of the target quality parameter sample value by using a plurality of different transcoding quality parameters, to obtain a plurality of transcoded images that is in the target image format and that corresponds to the plurality of different transcoding quality parameters. Using an example in which the quality parameter of the source image format falls within a value interval from 0 to 100, the at least one quality parameter sample value of the source image format may be (5, 10, 15, 20, 25, 30, . . . , 85, 90, 95). In another embodiment, more quality parameter sample values or some of the quality parameter sample values may be selected as required. Correspondingly, using an example in which the transcoding quality parameter falls within the value interval from 0 to 100, for the source image of the target quality parameter sample value, the image transcoding apparatus respectively performs transcoding by using transcoding quality parameters of (5, 10, 15, 20, 25, 30, . . . , 85, 90, 95), to obtain transcoded images respectively corresponding to 19 transcoding quality parameters. Next, the image transcoding apparatus compares each transcoded image with the source image of the target quality parameter sample value, determines, in the plurality of transcoded images, a transcoded image whose image quality satisfies a preset quality requirement and image data volume is minimum, and uses a transcoding quality parameter corresponding to the transcoded image whose image quality satisfies the preset quality requirement and image data volume is minimum as a quality parameter that is associated with the target image format and that corresponds to the target quality parameter sample value. The image transcoding apparatus compares each transcoded image with the source image of the target quality parameter sample value to obtain an image content difference between each transcoded image and the source image. A larger difference indicates lower image quality of the transcoded image. Next, as the transcoded images corresponding to the 19 transcoding quality parameters are obtained in the foregoing example, assuming that the preset quality requirement is that the image content difference between the transcoded image and the source image does not exceed 10%, the image transcoding apparatus searches the transcoded images corresponding to the 19 transcoding quality parameters for a transcoded image satisfying the preset quality requirement. For example, if transcoded images corresponding to QPs that are 5, 10, and 15 satisfy the quality requirement that the image content difference from the source image does not exceed 10%, but the transcoded image corresponding to the QP that is 15 has a minimum image data volume, the image transcoding apparatus uses the QP that is 15 as the quality parameter that is associated with the target image format and that corresponds to the target quality parameter sample value.

The foregoing sample transcoding and quality selection process is performed for each of the at least one quality parameter sample value of the source image format, so that the image transcoding apparatus can obtain the quality parameter that is associated with the target image format and that corresponds to each quality parameter sample value.

Figure 2:
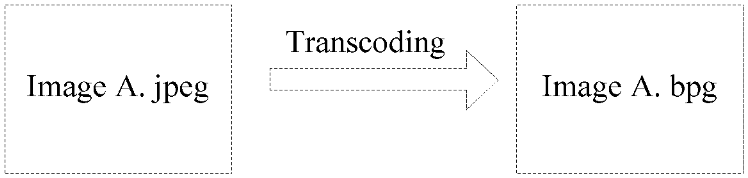
FIG. 2 is a schematic diagram of image transcoding according to an embodiment of this application.

In some other embodiments, the mapping relationship between the quality parameter of the source image format and the quality parameter of the target image format includes a mapping formula for calculating the quality parameter of the target image format according to the quality parameter of the source image format. The image transcoding apparatus may train the mapping formula by using quality parameters of a plurality of transcoded images in the target image format and source image quality parameters that are of source images and that correspond to the quality parameters as training parameters, so that the trained mapping formula is approximate to a correspondence between the quality parameters of the plurality of transcoded images and the source image quality parameters that are of the source images and that correspond to the quality parameters. To be specific, the mapping relationship between the quality parameter of the source image and the quality parameter of the target image format the target image format is trained by using a plurality of groups of quality parameters of transcoded images that are of the target image format and whose transcoding efficiency is known to satisfy the requirement and source image quality parameters that are of source images and that correspond to the quality parameters. In image transcoding shown in FIG. 2, a source image format is JPEG, and a target image format is Better Portable Graphics (BPG). The source image quality parameter of the source image is normalized to a value ranging from 0 to 100. A larger value indicates higher image quality of the source image. A QP is used as a target image quality parameter to represent image quality of a transcoded image. A smaller QP indicates higher quality of a transcoded target image. For example, it is known that transcoding efficiency of an image A, an image B, and an image C satisfies the requirement, a source image quality parameter of the image A is 80, and a corresponding quality parameter of the image A after transcoding is 24; a source image quality parameter of the image B is 70, and a corresponding quality parameter of the image B after transcoding is 27; a source image quality parameter of the image C is 60, and a corresponding quality parameter of the image B after transcoding is 24. It may be predicted according to the three groups of the quality parameters of the transcoded images and the source image quality parameters that are of the source images and that correspond to the quality parameters, that the mapping formula for calculating the quality parameter of the target image format according to the quality parameter of the source image is:

$$DQP=-0.6*SQP+72$$

The DQP is a quality parameter of the BPG image after transcoding, and the SQP is a source image quality parameter of the JPEG format that ranges from 0 to 100 after normalization.

It should be noted that, the training manner of the mapping relationship between the quality parameter of the source image format and the quality parameter of the target image format and the mapping relationship that is obtained through training and that is between the quality parameter of the source image and the quality parameter of the target image format are merely examples. A person skilled in the art may obtain more training manners and more mapping relationships between a quality parameter of a source image and a quality parameter of a target image format according to the content disclosed in the embodiments of this application. For example, a simpler mapping relationship is:

$$DQP=SQP, \text{ and } DQP=100-SQP, \text{ or}$$

$$DQP=SQP+N,$$

where N is a set constant or a constant obtained through training.

S202. Obtain, according to the mapping relationship between the quality parameter of the source image format and the quality parameter of the target image format, a target image quality parameter that is associated with the target image format and that corresponds to a source image quality parameter of a source image.

In some embodiments, if the mapping relationship between the quality parameter of the source image format and the quality parameter of the target image format includes the at least one quality parameter sample value of the source image format and the quality parameter that is associated with the target image format and that corresponds to each quality parameter sample value of the source image format, when needing to transcode the source image, the image transcoding apparatus may search the mapping relationship between the quality parameter of the source image format and the quality parameter of the target image format for a quality parameter sample value most approximate to the source image quality parameter of the source image, use a quality parameter that is associated with the target image format and that corresponds to the quality parameter sample value as the target image quality parameter that is associated with the target image format and that corresponds to the source image quality parameter of the source image. For example, if the source image quality parameter of the source image is 54, the most approximate quality parameter sample value is 55. The image transcoding apparatus searches the mapping relationship between the quality parameter of the source image format and the quality parameter of the target image format for a quality parameter that is associated with the target image format and that corresponds to the quality parameter sample value being 55, and determines the quality parameter that is associated with the target image format and that corresponds to the quality parameter sample value being 55 as the target image quality parameter of the target image format in the transcoding.

In another embodiment, if the mapping relationship between the quality parameter of the source image format and the quality parameter of the target image format includes the mapping formula for calculating the quality parameter of the target image format according to the quality parameter of the source image format, when needing to transcode the source image, the image transcoding apparatus may substitute the source image quality parameter of the source image into the mapping formula to calculate the target image quality parameter of the target image format in the transcoding.

S203. Transcode the source image according to the target image quality parameter to obtain a target image in the target image format.

Specifically, the transcoding the source image may include:

decoding the source image into original pixel data, for example, into RGB original pixel data, where if the source image is in a JPEG format, JPEG image data is decoded into the RGB original pixel data; and re-encoding the original pixel data according to the target image quality parameter to obtain the target image in the target image format. For example, the target image format is BPG, BPG image encoding is performed according to the original pixel data obtained through decoding, and an encoding quality configuration of a BPG image is determined according to the target image quality parameter. For example, if the determined target image quality parameter is DQP=40, the BPG image encoding is performed on the original pixel data according to the QP=40.

In this embodiment of this application, a corresponding quality configuration is used according to the quality parameter of the source image for image transcoding, to avoid a waste of a storage resource or a network transmission resource that is caused by redundancy of a data volume of a transcoded image file due to that a relatively high quality configuration is used for the target image when a quality configuration of the source image is relatively low.

Figure 5:
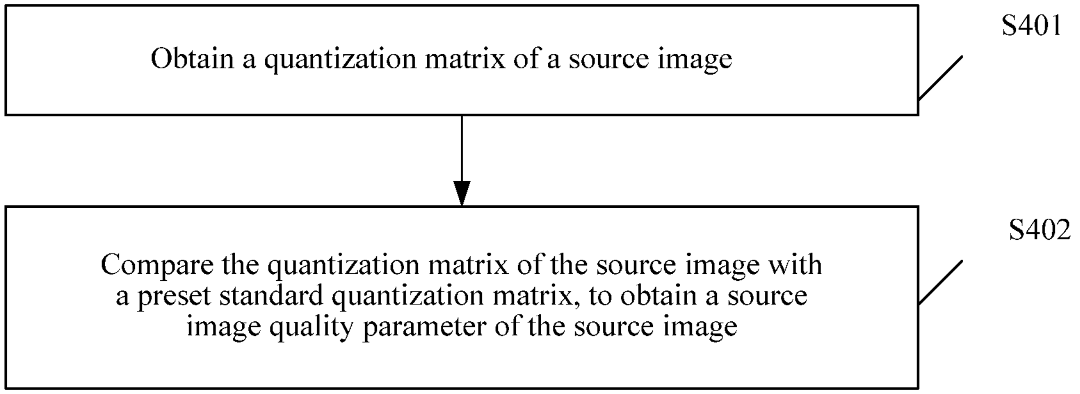
FIG. 5 is a schematic flowchart of implementation of a source image quality parameter obtaining method according to an embodiment of this application.

FIG. 5 is a schematic flowchart of implementation of a source image quality parameter obtaining method according to an embodiment of this application. As shown in the figure, a procedure of the source image quality parameter obtaining method in this embodiment may include the following steps:

S401. Obtain a quantization matrix of a source image.

For example, using an example in which the source image is in a JPEG format, the quantization matrix may be a 8×8 quantization coefficient matrix, and may be a 16×16 matrix or a matrix of another size in another embodiment. For example, as shown below:

$$S_{8\times 8}=\begin{bmatrix} 16 & 11 & 10 & 16 & 24 & 50 & 51 & 61 \\ 12 & 12 & 14 & 19 & 26 & 58 & 60 & 55 \\ 14 & 13 & 16 & 24 & 50 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

In some embodiments, an image transcoding apparatus may parse a define quantization table (DQT) in JPEG file data, which is usually a data segment starting from the DQT in the JPEG file data, to obtain a JPEG 8×8 quantization matrix.

In some embodiments, a JPEG image may include more than one quantization matrix, for example, include one luminance quantization matrix and a chroma quantization matrix. For ease of description, in this embodiment, only the luminance quantization matrix is used as an example for description.

S402. Compare the quantization matrix of the source image with a preset standard quantization matrix, to obtain a source image quality parameter of the source image.

In a specific implementation, the image transcoding apparatus may obtain a value of a coefficient of variation between the quantization matrix of the source image and the preset standard quantization matrix according to a ratio of each coefficient in the quantization matrix of the source image to a coefficient at a corresponding location in the standard quantization matrix.

The preset standard quantization matrix may be a quantization matrix that is preset according to a psycho-visual threshold and that achieves a specified standard for an image encoding quality effect of luminance or chroma of the JPEG image. For example, the luminance quantization matrix may be:

$$K_{8\times 8} = \begin{bmatrix} 6 & 4 & 4 & 6 & 10 & 16 & 20 & 24 \\ 5 & 5 & 6 & 8 & 10 & 23 & 24 & 22 \\ 6 & 5 & 6 & 10 & 16 & 23 & 28 & 22 \\ 6 & 7 & 9 & 12 & 20 & 35 & 32 & 25 \\ 7 & 9 & 15 & 22 & 27 & 44 & 41 & 31 \\ 10 & 14 & 22 & 26 & 32 & 42 & 45 & 37 \\ 20 & 26 & 31 & 35 & 41 & 48 & 48 & 50 \\ 29 & 37 & 38 & 39 & 45 & 50 & 41 & 50 \end{bmatrix}$$

The chroma quantization matrix may be:

$$J_{8\times 8} = \begin{bmatrix} 17 & 18 & 24 & 47 & 99 & 99 & 99 & 99 \\ 18 & 21 & 26 & 66 & 99 & 99 & 99 & 99 \\ 24 & 26 & 56 & 99 & 99 & 99 & 99 & 99 \\ 47 & 66 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \end{bmatrix}$$

Using the luminance quantization matrix as an example, the image transcoding apparatus may calculate a ratio of a coefficient in the luminance quantization matrix of the source image to that at a corresponding location in a luminance standard quantization matrix, to obtain a value of a coefficient of variation between the quantization matrix of the source image and the standard quantization matrix.

Further, for example, a specific algorithm for calculating the ratio of the coefficient in the luminance quantization matrix of the source image to that at the corresponding location in the luminance standard quantization matrix, to obtain the value of the coefficient of variation between the quantization matrix of the source image and the standard quantization matrix may be as follows:

A value of a coefficient of variation SUM between the quantization matrix of the source image and the standard quantization matrix is defined as:

$$\text{SUM} = \left(\sum_{i}, {}_{j}R_{i,j}\right) \Big/ 64, \text{ where } R_{i,j} = 100.0 * \frac{K_{i,j}}{S_{i,j}}$$

For a particular case: for example, if $K_{i,j}=0$, $R_{i,j}=999.99$.

Next, the image transcoding apparatus may normalize the value of the coefficient of variation SUM according to a preset normalization algorithm to obtain the source image quality parameter.

For example, the image transcoding apparatus may normalize the value of the coefficient of variation according to the preset normalization algorithm to obtain the source image quality parameter in a value range from 0 to 100. The normalization algorithm may be, for example:

if SUM≤100.0, the JPEG quality parameter Q=(200.0−SUM)/2.0; or if SUM>100.0, the JPEG quality parameter Q=5000.0/SUM.

For a particular case: if all coefficients $K_{i,j}$ in $K_{8\times 8}$ are 1, it indicates that the JPEG image is not quantized and has optimal quality, and the JPEG quality parameter Q is equal to 100.

The foregoing manner of calculating the value of the coefficient of variation according to the ratio of each coefficient in the quantization matrix of the source image to that at the corresponding location in the preset standard quantization matrix and the algorithm for normalizing the value of the coefficient of variation to obtain the source image quality parameter are merely used as examples. Different calculation manners and algorithms obtained by a person skilled in the art through proper changes according to the manner provided in this application all belong to the protection scope of the claims in this application.

In this way, the image transcoding apparatus may compare a difference between the luminance quantization matrix of the source image and the preset luminance standard quantization matrix to obtain the source image quality parameter of the source image. In another embodiment, the image transcoding apparatus may alternatively compare a difference between the chroma quantization matrix of the source image and a preset chroma standard quantization matrix to obtain the source image quality parameter of the source image, or comprehensively calculate the source image quality parameter of the source image with reference to a difference between the luminance quantization matrix of the source image and the preset luminance standard quantization matrix and a difference between the chroma quantization matrix of the source image and a preset chroma standard quantization matrix. Details are not described in this embodiment of this application.

Further, in some embodiments, after obtaining the source image quality parameter of the source image, the image transcoding apparatus may transcode the source image according to the source image quality parameter to obtain a target image in a target image format, where a target image quality parameter of the target image matches the source image quality parameter.

The transcoding the source image according to the source image quality parameter to obtain a target image in a target image format may further include:

obtaining, according to a mapping relationship between a quality parameter of a source image format and a quality parameter of a target image format, the target image quality parameter that is associated with the target image format and that corresponds to the source image quality parameter of the source image; and transcoding the source image according to the target image quality parameter, to obtain the target image in the target image format.

This embodiment of this application provides a method for obtaining the source image quality parameter of the source image, to quickly and accurately obtain a source image quality configuration of the source image when needing to transcode the image, thereby dynamically transcode the image according to the source image quality configuration of the source image.

Figure 6:
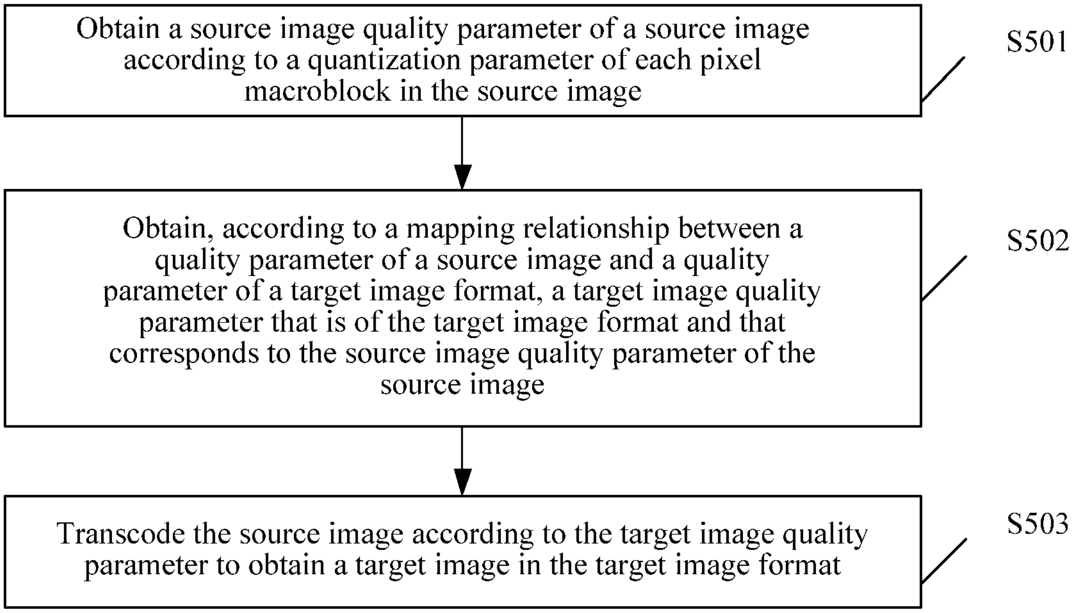
FIG. 6 is a schematic flowchart of implementation of an image transcoding method according to still another embodiment of this application.

FIG. 6 is a schematic flowchart of implementation of an image transcoding method according to another embodiment of this application. As shown in the figure, a procedure of the image transcoding method in this embodiment may include the following steps:

S501. Obtain a source image quality parameter of a source image according to a QP of each pixel macroblock in the source image.

In this embodiment, the source image may be divided into a plurality of pixel macroblocks, and each pixel macroblock has a QP. For example, the QP of each pixel macroblock in the source image is averaged to obtain an image quantization parameter the source image. In some embodiments, the image QP of the source image may be directly used as the source image quality parameter; or may be normalized by using a particular normalization algorithm, to obtain the source image quality parameter of the source image after the normalization.

S502. Obtain, according to a mapping relationship between a quality parameter of a source image format and a quality parameter of a target image format, a target image quality parameter that is associated with the target image format and that corresponds to the source image quality parameter of the source image.

To be specific, a quality parameter configuration used by an image transcoding apparatus to transcode the source image should match the quality parameter of the source image. The "match" herein may be "the same", that is, the target image quality parameter of the target image format is the same as the source image quality parameter of the source image; or may be "a mapping relationship in which the quality parameters are different", for example, a mapping formula for calculating the quality parameter of the target image format according to the quality parameter of the source image.

For example, the image QP of the source image is directly used as the source image quality parameter, and an QP is used as the target image quality parameter to represent image quality of a transcoded image, and the mapping relationship between the quality parameter of the source image and the quality parameter of the target image format may be:

$$DQP=SQP; \text{ or}$$

$$DQP=SQP+N,$$

where N is a set constant or a constant obtained through training.

S503. Transcode the source image according to the target image quality parameter to obtain a target image in the target image format.

Specifically, the transcoding the source image may include:

decoding the source image into original pixel data, for example, into RGB original pixel data, where if the source image is in a JPEG format, JPEG image data is decoded into the RGB original pixel data; and re-encoding the original pixel data according to the target image quality parameter to obtain the target image in the target image format. For example, the target image format is BPG, BPG image encoding is performed according to the original pixel data obtained through decoding, and an encoding quality configuration of a BPG image is determined according to the target image quality parameter. For example, if the determined target image quality parameter is DQP=40, the BPG image encoding is performed on the original pixel data according to the QP=40.

In this embodiment of this application, the source image quality parameter of the source image is obtained according to the QP of each pixel macroblock in the source image, and then a corresponding quality configuration is used according to the quality parameter of the source image for image transcoding, to avoid a waste of a storage resource or a network transmission resource that is caused by redundancy of a data volume of a transcoded image file due to that a relatively high quality configuration is used for the target image when a quality configuration of the source image is relatively low.

Figure 7:
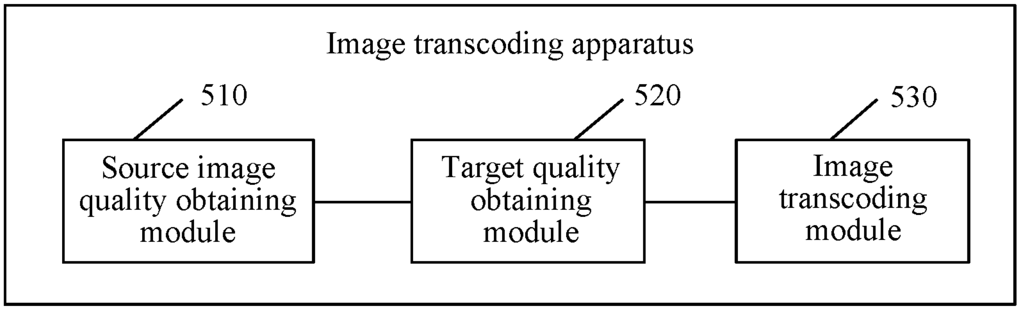
FIG. 7 is a schematic structural diagram of an image transcoding apparatus according to an embodiment of this application.

FIG. 7 is a schematic structural diagram of an image transcoding apparatus according to an embodiment of this application. As shown in the figure, the image transcoding apparatus in this embodiment may at least include a source image quality obtaining module 510, a target quality obtaining module 520, and an image transcoding module 530.

The source image quality obtaining module 510 is configured to obtain a source image quality parameter of a source image.

The source image quality parameter indicates image quality of the source image. The image quality usually can reflect evaluation of people on an image in terms of visual perception. The evaluation may include subjective evaluation and objective evaluation. The subjective evaluation means that an evaluator directly scores image quality of a to-be-evaluated image subjectively. The objective evaluation means digitizing an image and calculating an image quality score of an image by using a machine algorithm. In addition, the image quality evaluation may further be classified into image quality evaluation having a reference and image quality evaluation having no reference. The image quality evaluation having a reference usually refers to evaluation of an error level of a tested image (namely, a target image) relative to a standard image (namely, an original image), and the image quality evaluation having no reference is an evaluation manner specific only to an image. A common image quality evaluation algorithm may include: a structural similarity index measurement (SSIM) algorithm, a mean square error (MSE) algorithm, an information fidelity criterion (IFC) algorithm, a visual information fidelity (VIF) algorithm, and the like. The image transcoding apparatus may obtain the source image quality parameter of the source image in the foregoing manner, or may receive a result of the source image quality parameter from another device or in another manner, for example, receive the source image quality parameter of the source image through manual entering or from a third device or a network server.

In some embodiments, the source image quality obtaining module 510 may be specifically configured to:

obtain a QP of each pixel macroblock in the source image to obtain the source image quality parameter of the source image. Specifically, the implementation may include: obtaining an image QP of the source image according to the QP of each pixel macroblock in the source image, and then determining the source image quality parameter according to the image QP of the source image (where like a source image quality parameter obtained through normalization, the source image quality parameter may be, for example, a value ranging from 0 to 100). The manner can be applicable to obtaining a source image quality parameter of a source image in an image format such as WebP. An implementation process of the manner is specifically described above with reference to FIG. 4, and details are not described in this embodiment again.

Figure 8:
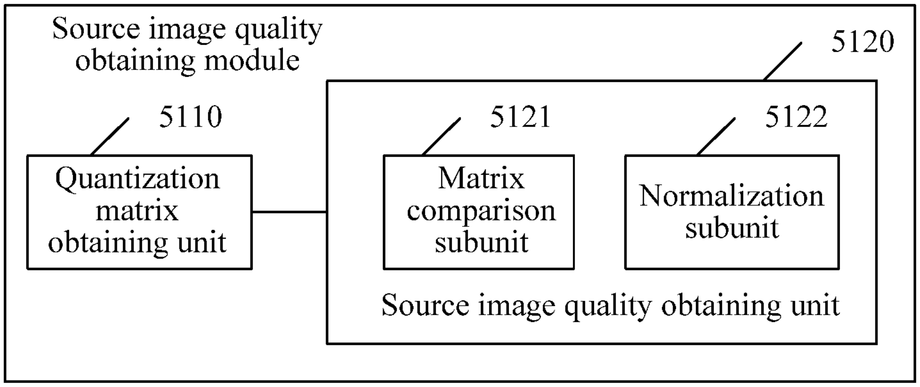
FIG. 8 is a schematic structural diagram of a source image quality obtaining module in an image transcoding apparatus according to an embodiment of this application.

In some other embodiments, as shown in FIG. 8, the source image quality obtaining module 510 may include:

a quantization matrix obtaining unit 5110, configured to obtain a quantization matrix of the source image; and a source image quality obtaining unit 5120, configured to compare the quantization matrix of the source image with a preset standard quantization matrix, to obtain the source image quality parameter of the source image.

In some embodiments, the source image quality obtaining unit 5120 may further include:

a matrix comparison subunit 5121, configured to obtain a value of a coefficient of variation between the quantization matrix of the source image and the preset standard quantization matrix according to a ratio of each coefficient in the quantization matrix of the source image to a coefficient at a corresponding location in the standard quantization matrix; and a normalization subunit 5122, configured to normalize the value of the coefficient of variation according to a preset normalization algorithm to obtain the source image quality parameter (where for example, the source image quality parameter obtained through normalization is a value ranging from 0 to 100). The manner can be applicable to obtaining a source image quality parameter of a source image in an image format such as JPEG. An implementation process of the manner is specifically described below with reference to FIG. 5.

The image transcoding module 530 is configured to transcode the source image according to the source image quality parameter to obtain a target image in a target image format, where a target image quality parameter of the target image matches the source image quality parameter.

To be specific, a quality parameter configuration used by the image transcoding module 530 to transcode the source image should match the quality parameter of the source image. The "match" herein may be "the same", that is, the target image quality parameter of the target image format is the same as the source image quality parameter of the source image; or may be "a mapping relationship in which the quality parameters are different", for example, a mapping formula for calculating the quality parameter of the target image format according to the quality parameter of the source image. The target image quality parameter of the target image may also be used for indicating image quality of the target image, for example, may be a QP of the target image. A smaller QP indicates higher image quality of the target image.

Figure 10:
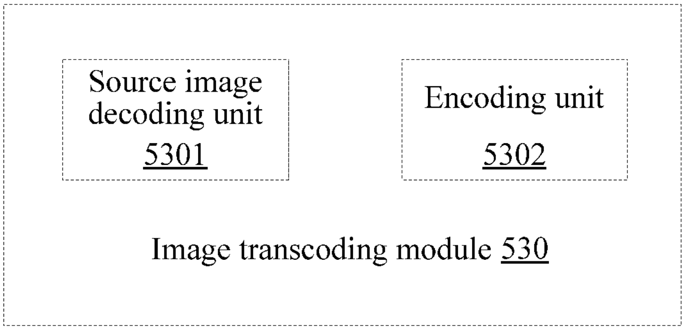
FIG. 10 is a schematic structural diagram of an image transcoding module in an image transcoding apparatus according to an embodiment of this application.

In some embodiments, as shown in FIG. 10, the image transcoding module 530 may further include:

a source image decoding unit 5301, configured to decode the source image into original pixel data; and an encoding unit 5302, configured to re-encode the original pixel data according to the target image quality parameter to obtain the target image in the target image format.

The target quality obtaining module 520 is configured to obtain, according to a mapping relationship between a quality parameter of a source image format and a quality parameter of a target image format, the target image quality parameter that is associated with the target image format and that corresponds to the source image quality parameter of the source image.

The image transcoding module 530 is configured to transcode the source image according to the target image quality parameter to obtain the target image in the target image format.

Figure 9:
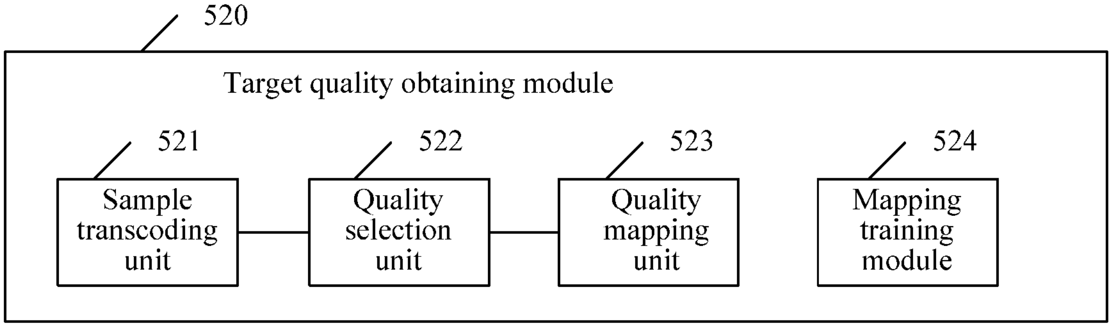
FIG. 9 is a schematic structural diagram of a target quality obtaining module in an image transcoding apparatus according to an embodiment of this application.

In a specific implementation, the mapping relationship between the quality parameter of the source image format and the quality parameter of the target image format may include at least one quality parameter sample value of the source image format and a quality parameter that is associated with the target image format and that corresponds to each quality parameter sample value of the source image format. In this implementation, as shown in FIG. 9, the target quality obtaining module 520 may further include:

a sample transcoding unit 521, configured to respectively transcode a source image of a target quality parameter sample value by using a plurality of different transcoding quality parameters, to obtain a plurality of transcoded images that is in the target image format and that corresponds to the plurality of different transcoding quality parameters; and a quality selection unit 522, configured to: compare each transcoded image with the source image of the target quality parameter sample value, determine, in the plurality of transcoded images, a transcoded image whose image quality satisfies a preset quality requirement and image data volume is minimum, and use a transcoding quality parameter corresponding to the transcoded image whose image quality satisfies the preset quality requirement and image data volume is minimum as a quality parameter that is associated with the target image format and that corresponds to the target quality parameter sample value.

To be specific, the target quality obtaining module 520 may traverse each of the at least one quality parameter sample value of the source image format, and use each quality parameter sample value as the target quality sample value; and the sample transcoding unit 521 respectively transcodes the source image of the target quality parameter sample value by using the plurality of different transcoding quality parameters, to obtain the plurality of transcoded images that is in the target image format and that corresponds to the plurality of different transcoding quality parameters. Next, the quality selection unit 522 compares each transcoded image with the source image of the target quality parameter sample value, selects, from the plurality of transcoded images, the transcoded image whose image quality satisfies the preset quality requirement and image data volume is minimum, and uses the transcoding quality parameter corresponding to the transcoded image whose image quality satisfies the preset quality requirement and image data volume is minimum as the quality parameter that is associated with the target image format and that corresponds to the target quality parameter sample value. The foregoing sample transcoding and quality selection process is performed for each of the at least one quality parameter sample value of the source image format, so that the target quality obtaining module 520 can obtain the quality parameter that is associated with the target image format and that corresponds to each quality parameter sample value.

Further, the target quality obtaining module 520 may further include:

a quality mapping unit 523, configured to search the mapping relationship between the quality parameter of the source image format and the quality parameter of the target image format for a quality parameter sample value most approximate to the source image quality parameter of the source image, and use a quality parameter that is associated with the target image format and that corresponds to the quality parameter sample value as the target image quality parameter that is associated with the target image format and that corresponds to the source image quality parameter of the source image.

In some other embodiments, the mapping relationship between the quality parameter of the source image format and the quality parameter of the target image format includes a mapping formula for calculating the quality parameter of the target image format according to the quality parameter of the source image format. The target quality obtaining module 520 may further include:

a mapping formula training module 524, configured to train the mapping formula by using quality parameters of a plurality of transcoded images in the target image format and source image quality parameters that are of source images and that correspond to the quality parameters as training parameters, so that the trained mapping formula is approximate to a correspondence between the quality parameters of the plurality of transcoded images and the source image quality parameters that are of the source images and that correspond to the quality parameters.

In a specific implementation, the image transcoding apparatus may train the mapping formula by using the quality parameters of the plurality of transcoded images in the target image format and the source image quality parameters that are of the source images and that correspond to the quality parameters as the training parameters, so that the trained mapping formula is approximate to the correspondence between the quality parameters of the plurality of transcoded images and the source image quality parameters that are of the source images and that correspond to the quality parameters.

It should be noted that the target quality obtaining module 520 may include any one of the functional units shown in FIG. 9, or may include all the functional units. The sample transcoding unit 521, the quality selection unit 522, and the mapping formula training unit 524 may alternatively cooperate with each other to obtain the mapping relationship between the quality parameter of the source image format and the quality parameter of the target image format. For example, the sample transcoding unit 521 and the quality selection unit 522 obtain the at least one quality parameter sample value of the source image format and the quality parameter that is associated with the target image format and that corresponds to each quality parameter sample value of the source image format, and then the mapping formula training unit 524 obtains, through training according to the correspondence between the quality parameter sample value of the source image format and the quality parameter of the target image format, the mapping formula for calculating the quality parameter of the target image format according to the quality parameter of the source image.

In this embodiment of this application, the image transcoding apparatus may use a corresponding quality configuration according to the quality parameter of the source image for image transcoding, to avoid a waste of a storage resource or a network transmission resource that is caused by redundancy of a data volume of a transcoded image file due to that a relatively high quality configuration is used for the target image when a quality configuration of the source image is relatively low.

It should be noted herein that, the image transcoding apparatus may be an electronic device such as a PC, or may be a portable electronic device such as a PAD, a tablet computer, or a handheld computer, and is not limited to the descriptions herein. Alternatively, the image transcoding apparatus may be an electronic device that is formed by using a cluster server and in which units are integrated into an entity to implement functions or separately disposed. An image transcoding apparatus includes at least a database configured to store data and a processor configured to process data, and may include a built-in storage medium or a separately disposed storage medium.

For the processor configured to process data, the processor may be implemented by using a microprocessor, a central processing unit (CPU), a digital signal processor (DSP), or a field programmable gate array (FPGA) during processing. The storage medium includes an operational instruction. The operational instruction may be computer executable code. The steps in the procedure of the image transcoding method shown in FIG. 1 in the foregoing embodiment of this application are implemented by using the operational instruction.

Figure 11:
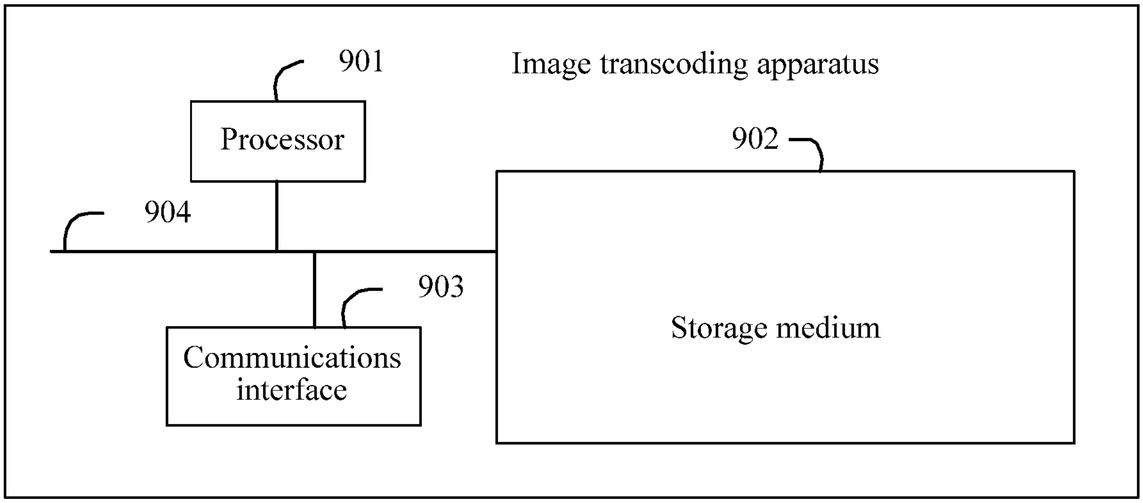
FIG. 11 is a schematic structural composition diagram of hardware of an image transcoding apparatus according to an embodiment of this application.

An example of the image transcoding apparatus used as a hardware entity is shown in FIG. 11. The apparatus includes a processor 901, a storage medium 902, and at least one external communications interface 903. The processor 901, the storage medium 902, and the communications interface 903 are connected to each other via a bus 904.

The processor 901 in the image transcoding apparatus may invoke an operational instruction in the storage medium 902 to perform the following procedure:

obtaining a source image quality parameter of a source image; and transcoding the source image according to the source image quality parameter to obtain a target image in a target image format, where a target image quality parameter of the target image matches the source image quality parameter.

It should be noted herein that the foregoing descriptions of the image transcoding apparatus are similar to the descriptions of the image transcoding method above, and details are not described herein again. For technical details not disclosed in this embodiment of the image transcoding apparatus in this application, refer to the descriptions of the method embodiment in this application.

Figure 12:
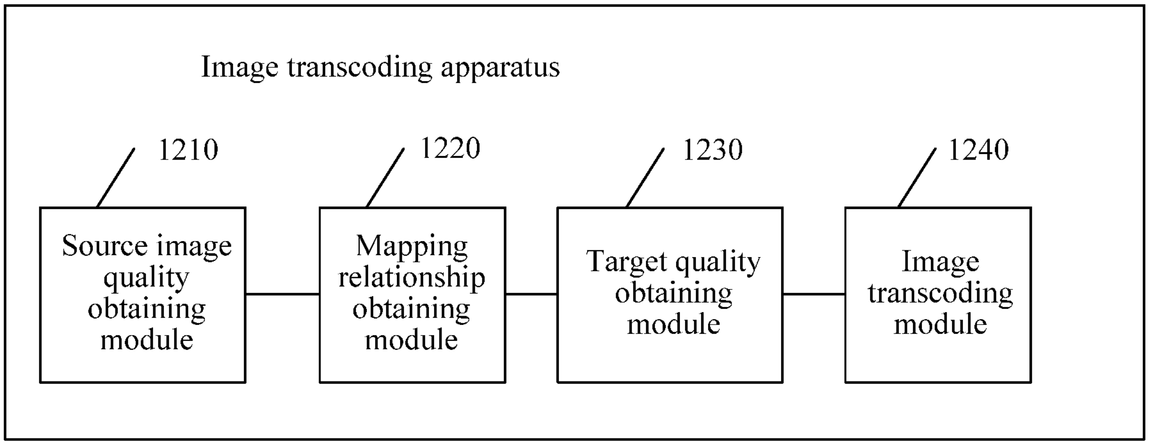
FIG. 12 is a schematic structural diagram of an image transcoding apparatus according to another embodiment of this application.

FIG. 12 is a schematic structural diagram of an image transcoding apparatus according to another embodiment of this application. As shown in the figure, the image transcoding apparatus in this embodiment may at least include a mapping relationship obtaining module 1220, a target quality obtaining module 1230, and an image transcoding module 1240.

The mapping relationship obtaining module 1220 is configured to obtain a mapping relationship between a quality parameter of a source image and a quality parameter of a target image format.

Figure 13:
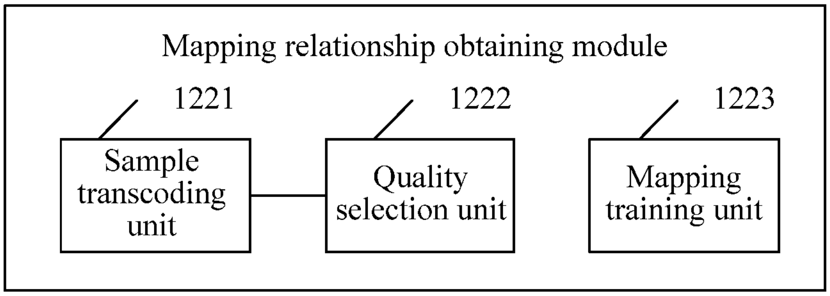
FIG. 13 is a schematic structural diagram of a mapping relationship obtaining module in an image transcoding apparatus according to an embodiment of this application.

In some embodiments, the mapping relationship between the quality parameter of the source image format and the quality parameter of the target image format may include at least one quality parameter sample value of the source image format and a quality parameter that is associated with the target image format and that corresponds to each quality parameter sample value of the source image format. In this implementation, as shown in FIG. 13, the mapping relationship obtaining module 1220 may further include:

a sample transcoding unit 1221, configured to respectively transcode a source image of a target quality parameter sample value by using a plurality of different transcoding quality parameters, to obtain a plurality of transcoded images that is in the target image format and that corresponds to the plurality of different transcoding quality parameters; and a quality selection unit 1222, configured to: compare each transcoded image with the source image of the target quality parameter sample value, select, from the plurality of transcoded images, a transcoded image whose image quality satisfies a preset quality requirement and image data volume is minimum, and use a transcoding quality parameter corresponding to the transcoded image whose image quality satisfies the preset quality requirement and image data volume is minimum as a quality parameter that is associated with the target image format and that corresponds to the target quality parameter sample value.

To be specific, each of the at least one quality parameter sample value of the source image format may be traversed, and each quality parameter sample value is used as the target quality sample value; and the sample transcoding unit 1221 respectively transcodes the source image of the target quality parameter sample value by using the plurality of different transcoding quality parameters, to obtain the plurality of transcoded images that is in the target image format and that corresponds to the plurality of different transcoding quality parameters. Using an example in which the quality parameter of the source image format falls within a value interval from 0 to 100, the at least one quality parameter sample value of the source image format may be (5, 10, 15, 20, 25, 30, . . . , 85, 90, 95). In another embodiment, more quality parameter sample values or some of the quality parameter sample values may be selected as required. Correspondingly, using an example in which the transcoding quality parameter falls within the value interval from 0 to 100, for the source image of the target quality parameter sample value, the image transcoding apparatus respectively performs transcoding by using transcoding quality parameter of (5, 10, 15, 20, 25, 30, . . . , 85, 90, 95), to obtain transcoded images respectively corresponding to 19 transcoding quality parameters. Next, the quality selection unit 1222 compares each transcoded image with the source image of the target quality parameter sample value, selects, from the plurality of transcoded images, the transcoded image whose image quality satisfies the preset quality requirement and image data volume is minimum, and uses the transcoding quality parameter corresponding to the transcoded image whose image quality satisfies the preset quality requirement and image data volume is minimum as the quality parameter that is associated with the target image format and that corresponds to the target quality parameter sample value. The quality selection unit 1222 compares each transcoded image with the source image of the target quality parameter sample value to obtain an image content difference between each transcoded image and the source image. A larger difference indicates lower image quality of the transcoded image. Next, as the transcoded images corresponding to the 19 transcoding quality parameters are obtained in the foregoing example, assuming that the preset quality requirement is that the image content difference between the transcoded image and the source image does not exceed 10%, the quality selection unit 1222 searches the transcoded images corresponding to the 19 transcoding quality parameters for a transcoded image satisfying the preset quality requirement. For example, if transcoded images corresponding to QPs that are 5, 10, and 15 satisfy the quality requirement that the image content difference from the source image does not exceed 10%, but the transcoded image corresponding to the QP that is 15 has a minimum image data volume, the quality selection unit 1222 uses the QP that is 15 as the quality parameter that is associated with the target image format and that corresponds to the target quality parameter sample value.

The foregoing sample transcoding and quality selection process is performed for each of the at least one quality parameter sample value of the source image format, so that mapping relationship obtaining module 1220 can obtain the quality parameter that is associated with the target image format and that corresponds to each quality parameter sample value.

In some other embodiments, the mapping relationship between the quality parameter of the source image format and the quality parameter of the target image format includes a mapping formula used for calculating the quality parameter of the target image format according to the quality parameter of the source image format. The mapping relationship obtaining module 1220 may include:

a mapping training unit 1223, configured to train the mapping formula by using quality parameters of a plurality of transcoded images in the target image format and source image quality parameters that are of source images and that correspond to the quality parameters as training parameters, so that the trained mapping formula is approximate to a correspondence between the quality parameters of the plurality of transcoded images and the source image quality parameters that are of the source images and that correspond to the quality parameters.

The mapping training unit 1223 trains the mapping relationship between the quality parameter of the source image and the quality parameter of the target image format the target image format by using a plurality of groups of quality parameters of transcoded images that are of the target image format and whose transcoding efficiency is known to satisfy the requirement and source image quality parameters that are of source images and that correspond to the quality parameters. In image transcoding shown in FIG. 2, a source image format is JPEG, and a target image format is BPG. The source image quality parameter of the source image is normalized to a value ranging from 0 to 100. A larger value indicates higher image quality of the source image. A QP is used as the target image quality parameter to represent image quality of a transcoded image. A smaller QP indicates higher quality of a transcoded target image. For example, it is known that transcoding efficiency of an image A, an image B, and an image C satisfies the requirement, a source image quality parameter of the image A is 80, and a corresponding quality parameter of the image A after transcoding is 24; a source image quality parameter of the image B is 70, and a corresponding quality parameter of the image B after transcoding is 27; a source image quality parameter of the image C is 60, and a corresponding quality parameter of the image B after transcoding is 24. It may be predicted according to the three groups of the quality parameters of the transcoded images and the source image quality parameters that are of the source images and that correspond to the quality parameters, that the mapping formula for calculating the quality parameter of the target image format according to the quality parameter of the source image is:

$$DQP=-0.6*SQP+72$$

The DQP is a quality parameter of the BPG image after transcoding, and the SQP is a source image quality parameter of the JPEG format that ranges from 0 to 100 after normalization.

It should be noted that, the training manner of the mapping relationship between the quality parameter of the source image format and the quality parameter of the target image format and the mapping relationship that is obtained through training and that is between the quality parameter of the source image and the quality parameter of the target image format are merely examples. A person skilled in the art may obtain more training manners and more mapping relationships between a quality parameter of a source image and a quality parameter of a target image format according to the content disclosed in the embodiments of this application. For example, a simpler mapping relationship is:

$$DQP=SQP, \text{ and } DQP=100-SQP; \text{ or}$$

$$DQP=SQP+N,$$

where N is a set constant or a constant obtained through training.

The target quality obtaining module 1230 is configured to obtain, according to the mapping relationship between the quality parameter of the source image and the quality parameter of the target image format, a target image quality parameter that is associated with the target image format and that corresponds to the source image quality parameter of the source image.

In some embodiments, if the mapping relationship between the quality parameter of the source image format and the quality parameter of the target image format includes the at least one quality parameter sample value of the source image format and the quality parameter that is associated with the target image format and that corresponds to each quality parameter sample value of the source image format, when the image transcoding apparatus needs to transcode the source image, the target quality obtaining module 1230 may search the mapping relationship between the quality parameter of the source image format and the quality parameter of the target image format for a quality parameter sample value most approximate to the source image quality parameter of the source image, use a quality parameter that is associated with the target image format and that corresponds to the quality parameter sample value as the target image quality parameter that is associated with the target image format and that corresponds to the source image quality parameter of the source image. For example, if the source image quality parameter of the source image is 54, the most approximate quality parameter sample value is 55. The image transcoding apparatus searches the mapping relationship between the quality parameter of the source image format and the quality parameter of the target image format for a quality parameter that is associated with the target image format and that corresponds to the quality parameter sample value being 55, and determines the quality parameter that is associated with the target image format and that corresponds to the quality parameter sample value being 55 as the target image quality parameter of the target image format in the transcoding.

In another embodiment, if the mapping relationship between the quality parameter of the source image format and the quality parameter of the target image format includes the mapping formula for calculating the quality parameter of the target image format according to the quality parameter of the source image format, when the image transcoding apparatus needs to transcode the source image, the target quality obtaining module 1230 may substitute the source image quality parameter of the source image into the mapping formula to calculate the target image quality parameter of the target image format in the transcoding.

The image transcoding module 1240 is configured to transcode the source image according to the target image quality parameter to obtain a target image in the target image format.

In some embodiments, as shown in FIG. 10, the image transcoding module 1240 may further include:

a source image decoding unit, configured to decode the source image into original pixel data; and an encoding unit, configured to re-encode the original pixel data according to the target image quality parameter to obtain the target image in the target image format.

In some embodiments, the image transcoding apparatus may further include:

a source image quality obtaining module 1210, configured to obtain the source image quality parameter of the source image.

The source image quality parameter indicates image quality of the source image. A common image quality evaluation algorithm may include an SSIM algorithm, an MSE algorithm, an IFC algorithm, a VIF algorithm, and the like. The source image quality obtaining module 1210 may obtain the source image quality parameter of the source image in the foregoing manner, or may receive a result of the source image quality parameter from another device or in another manner, for example, receive the source image quality parameter of the source image through manual entering or from a third device or a network server.

In this embodiment of this application, the image transcoding apparatus may use a corresponding quality configuration according to the quality parameter of the source image for image transcoding, to avoid a waste of a storage resource or a network transmission resource that is caused by redundancy of a data volume of a transcoded image file due to that a relatively high quality configuration is used for the target image when a quality configuration of the source image is relatively low.

It should be noted herein that, the image transcoding apparatus may be an electronic device such as a PC, or may be a portable electronic device such as a PAD, a tablet computer, or a handheld computer, and is not limited to the descriptions herein. Alternatively, the image transcoding apparatus may be an electronic device that is formed by using a cluster server and in which units are integrated into an entity to implement functions or separately disposed. A image transcoding apparatus includes at least a database configured to store data and a processor configured to process data, and may include a built-in storage medium or a separately disposed storage medium.

For the processor configured to process data, the processor may be implemented by using a microprocessor, a CPU, a DSP, or an FPGA during processing. The storage medium includes an operational instruction. The operational instruction may be computer executable code. The steps in the procedure of the image transcoding method shown in FIG. 4 in the foregoing embodiment of this application are implemented by using the operational instruction.

Figure 14:
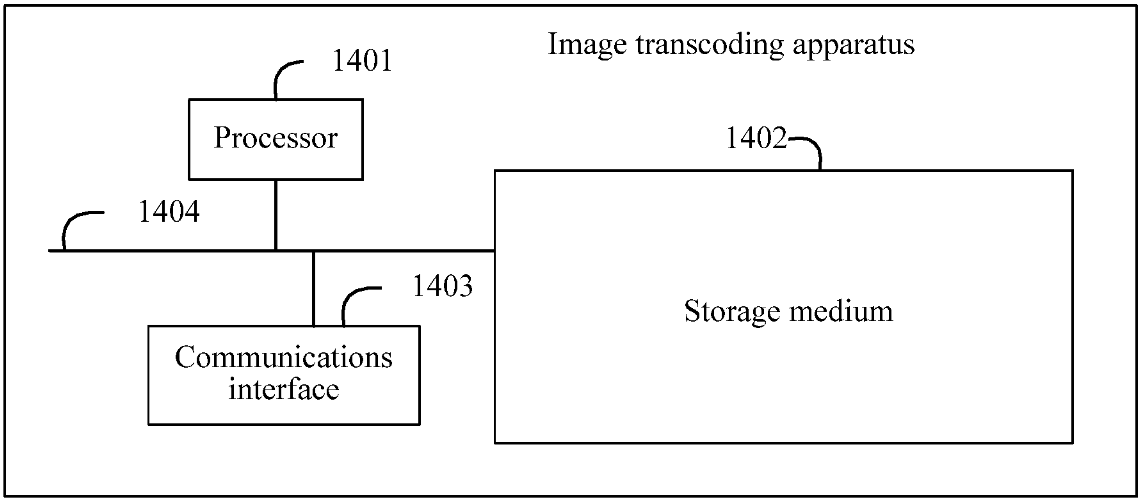
FIG. 14 is another schematic structural composition diagram of hardware of an image transcoding apparatus according to an embodiment of this application.

An example of the image transcoding apparatus used as a hardware entity is shown in FIG. 14. The apparatus includes a processor 1401, a storage medium 1402, and at least one external communications interface 1403. The processor 1401, the storage medium 1402, and the communications interface 1403 are connected to each other via a bus 1404.

The processor 1401 in the image transcoding apparatus may invoke an operational instruction in the storage medium 1402 to perform the following procedure:

obtaining a mapping relationship between a quality parameter of a source image format and a quality parameter of a target image format;

obtaining, according to the mapping relationship between the quality parameter of the source image format and the quality parameter of the target image format, a target image quality parameter that is associated with the target image format and that corresponds to a source image quality parameter of a source image; and transcoding the source image according to the target image quality parameter to obtain a target image in the target image format.

It should be noted herein that the foregoing descriptions of the image transcoding apparatus are similar to the descriptions of the image transcoding method above, beneficial effects are the same as those of the method, and details are not described herein again. For technical details not disclosed in this embodiment of the image transcoding apparatus in this application, refer to the descriptions of the method embodiment in this application.

Figure 15:
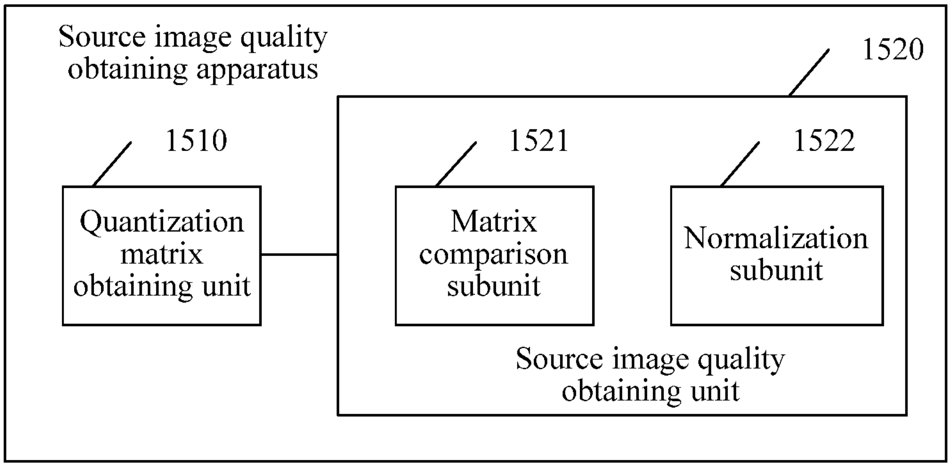
FIG. 15 is a schematic structural diagram of a source image quality obtaining apparatus according to an embodiment of this application.

FIG. 15 shows a source image quality parameter obtaining apparatus according to an embodiment of this application. As shown in the figure, the source image quality parameter obtaining apparatus in this embodiment of this application includes a quantization matrix obtaining unit 1510 and a source image quality obtaining unit 1520.

The quantization matrix obtaining unit 1510 is configured to obtain a quantization matrix of a source image.

For example, using an example in which the source image is in a JPEG format, the quantization matrix may be a 8×8 quantization coefficient matrix, and may be a 16×16 matrix or a matrix of another size in another embodiment.

In some embodiments, the image transcoding apparatus may parse a DQT in JPEG file data, which is usually a data segment starting from the DQT in the JPEG file data, to obtain a JPEG 8×8 quantization matrix.

In some embodiments, a JPEG image may include more than one quantization matrix, for example, include one luminance quantization matrix and a chroma quantization matrix. For ease of description, in this embodiment, only the luminance quantization matrix is used as an example for description.

The source image quality obtaining unit 1520 is configured to compare the quantization matrix of the source image with a preset standard quantization matrix, to obtain a source image quality parameter of the source image.

In some embodiments, the source image quality obtaining unit 1520 may further include a matrix comparison subunit 1521 and a normalization subunit 1522.

The matrix comparison subunit 1521 is configured to obtain a value of a coefficient of variation between the quantization matrix of the source image and the preset standard quantization matrix according to a ratio of each coefficient in the quantization matrix of the source image to a coefficient at a corresponding location in the standard quantization matrix.

The preset standard quantization matrix may be a quantization matrix that is preset according to a psycho-visual threshold and that achieves a specified standard for an image encoding quality effect of luminance or chroma of the source image.

Using the luminance quantization matrix as an example, the image transcoding apparatus may calculate a ratio of a coefficient in the luminance quantization matrix of the source image to that at a corresponding location in a luminance standard quantization matrix, to obtain a value of a coefficient of variation between the quantization matrix of the source image and the standard quantization matrix.

The normalization subunit 1522 is configured to normalize the value of the coefficient of variation according to a preset normalization algorithm to obtain the source image quality parameter.

In this embodiment, the source image quality parameter obtaining apparatus may be applicable to obtaining a source image quality parameter of a source image in an image format such as JPEG. For a specific implementation process and principle, refer to the implementation process described above with reference to FIG. 5, and details are not described in this embodiment again.

After obtaining the source image quality parameter through analysis, the source image quality parameter obtaining apparatus may send the source image quality parameter to another apparatus to transcode the source image, or the source image quality parameter obtaining apparatus may transcode the source image, to obtain a target image in a target image format, where a target image quality parameter of the target image matches the source image quality parameter.

The transcoding the source image according to the source image quality parameter to obtain a target image in a target image format may be specifically:

obtaining, according to a mapping relationship between a quality parameter of a source image format and a quality parameter of a target image format, the target image quality parameter that is associated with the target image format and that corresponds to the source image quality parameter of the source image; and transcoding the source image according to the target image quality parameter to obtain the target image in the target image format.

It should be noted herein that, the source image quality parameter obtaining apparatus may be an electronic device such as a PC, or may be a portable electronic device such as a PAD, a tablet computer, or a handheld computer, and is not limited to the descriptions herein. Alternatively, the source image quality parameter obtaining apparatus may be an electronic device that is formed by using a cluster server and in which units are integrated into an entity to implement functions or separately disposed. The source image quality parameter obtaining apparatus includes at least a database configured to store data and a processor configured to process data, and may include a built-in storage medium or a separately disposed storage medium.

For the processor configured to process data, the processor may be implemented by using a microprocessor, a CPU, a DSP, or an FPGA during processing. The storage medium includes an operational instruction. The operational instruction may be computer executable code. The steps in the procedure of the source image quality parameter obtaining method shown in FIG. 5 in the foregoing embodiment of this application are implemented by using the operational instruction.

Figure 16:
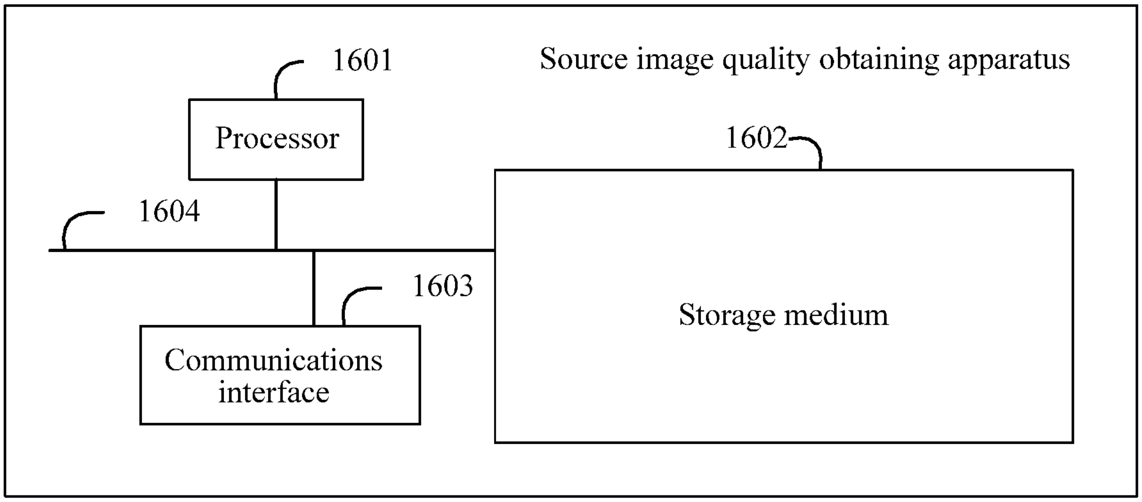
FIG. 16 is a schematic structural composition diagram of hardware of a source image quality obtaining apparatus according to an embodiment of this application.

An example of the source image quality parameter obtaining apparatus used as a hardware entity is shown in FIG. 16. The apparatus includes a processor 1601, a storage medium 1602, and at least one external communications interface 1603. The processor 1601, the storage medium 1602, and the communications interface 1603 are connected to each other via a bus 1604.

The processor 1601 in the image transcoding apparatus may invoke an operational instruction in the storage medium 1602 to perform the following procedure:

obtaining a quantization matrix of a source image; and comparing the quantization matrix of the source image with a preset standard quantization matrix, to obtain a source image quality parameter of the source image.

It should be noted herein that the foregoing descriptions of the source image quality parameter obtaining apparatus are similar to the descriptions of the source image quality parameter obtaining method above, beneficial effects are the same as those of the method, and details are not described herein again. For technical details not disclosed in this embodiment of the source image quality parameter obtaining apparatus in this application, refer to the descriptions of the method embodiment in this application.

In the several embodiments provided in this application, it should be understood that the disclosed apparatus and method may be implemented in other manners. The described device embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections between the components may be implemented through some interfaces, indirect couplings, or communications connections between the devices or units, an may be electrical connections, mechanical connections, or connections in other forms.

The units described as separated parts may be or may not be physically separated. The parts displayed as units may be or may not be a physical unit. That is, the units may be located in the same place, or may be distributed to many network units. Some or all of the units may be selected according to actual requirements to implement the objective of the solutions of the embodiments.

In addition, in the embodiments of this application, the functional units may be all integrated into one processing unit. Alternatively, the units may be respectively used as a unit. Alternatively, two or more units may be integrated into one unit. The integrated unit may be implemented in a hardware form, or may be implemented in a form of adding hardware and a software functional unit.

A person of ordinary skill in the art may understand that, some or all of the steps in the foregoing method embodiments may be implemented by using program instruction relevant hardware. The program may be stored in a computer readable storage medium. When the program is executed, steps including the method embodiments are performed. However, the storage medium includes various types of media that can store program code, for example, a mobile storage device, a read-only memory (ROM), a random access memory (RAM), a magnetic disk, or an optical disk.

Alternatively, when the integrated module in this application is implemented in the form of a software function module and sold or used as an independent product, the integrated module may be stored in a computer readable medium. Based on such an understanding, the technical solutions of the embodiments of this application essentially, or the part contributing to the existing technology, may be implemented in a form of a software product. The computer software product is stored in a storage medium, and includes several instructions for instructing a computer device (which may be a personal computer, a server, a network device, or the like) to perform all or a part of the methods described in the embodiments of this application. The foregoing storage medium includes: a medium that can store program code, for example, a mobile storage device, a ROM, a RAM, a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image transcoding method performed at a computing device having one or more processors and memory storing a plurality of programs to be executed by the one or more processors, the method comprising:

obtaining a source image quality parameter of a source image, the source image being a to-be-transcoded image, and the source image quality parameter being associated with a source image format and used for indicating image quality of the source image;

obtaining, according to the source image quality parameter and a preset mapping relationship between at least one quality parameter sample value of the source image format and a quality parameter of a target image quality parameter that is associated with a target image format and that corresponds to the source image quality parameter of the source image, further comprising:

searching the preset mapping relationship between the at least one quality parameter sample value of the source image format and the quality parameter of the target image format for a quality parameter sample value most approximate to the source image quality parameter of the source image; and using a quality parameter that is associated with the target image format and that corresponds to the quality parameter sample value as the target image quality parameter that is associated with the target image format and that corresponds to the source image quality parameter of the source image; and transcoding the source image in the source image format according to the target image quality parameter to obtain a target image in the target image format.

2. The image transcoding method according to claim 1, wherein the obtaining a source image quality parameter of a source image comprises:

obtaining a quantization matrix of the source image; and comparing the quantization matrix of the source image with a preset standard quantization matrix, to obtain the source image quality parameter of the source image.

3. The image transcoding method according to claim 2, wherein the comparing the quantization matrix of the source image with a preset standard quantization matrix, to obtain the source image quality parameter of the source image comprises:

obtaining a value of a coefficient of variation between the quantization matrix of the source image and the preset standard quantization matrix according to a ratio of each coefficient in the quantization matrix of the source image to a coefficient at a corresponding location in the standard quantization matrix; and normalizing the value of the coefficient of variation according to a preset normalization algorithm to obtain the source image quality parameter.

4. The image transcoding method according to claim 1, wherein the searching the mapping relationship between the at least one quality parameter sample value of the source image format and the quality parameter of the target image format further comprises:

using each quality parameter sample value as a target quality parameter sample value, and respectively transcoding a source image of the target quality parameter sample value by using a plurality of different transcoding quality parameters, to obtain a plurality of transcoded images that is in the target image format and that corresponds to the plurality of different transcoding quality parameters;

comparing each transcoded image with the source image of the target quality parameter sample value, and selecting, from the plurality of transcoded images, a transcoded image whose image quality satisfies a preset quality requirement and image data volume is minimum; and using a transcoding quality parameter corresponding to the transcoded image whose image quality satisfies the preset quality requirement and image data volume is minimum as a quality parameter that is associated with the target image format and that corresponds to the target quality parameter sample value.

5. The image transcoding method according to claim 1, wherein the obtaining a source image quality parameter of a source image comprises:

obtaining the source image quality parameter of the source image according to a quantization parameter of each pixel macroblock in the source image.

6. The image transcoding method according to claim 1, wherein the preset mapping relationship is a mapping formula used for calculating the target image quality parameter of the target image format according to the source image quality parameter of the source image; and the obtaining, according to the source image quality parameter and a preset mapping relationship, a target image quality parameter that is associated with a target image format and that corresponds to the source image quality parameter of the source image comprises:

substituting the source image quality parameter into the mapping formula, to calculate the target image quality parameter that is associated with the target image format and that corresponds to the source image quality parameter of the source image.

7. The image transcoding method according to claim 6, wherein before the obtaining a source image quality parameter of a source image, the method further comprises:

training the mapping formula by using quality parameters of a plurality of transcoded images in the target image format and source image quality parameters that are of source images and that correspond to the quality parameters as training parameters, so that the trained mapping formula is approximate to a correspondence between the quality parameters of the plurality of transcoded images and the source image quality parameters that are of the source images and that correspond to the quality parameters.

8. The image transcoding method according to claim 1, wherein the transcoding the source image according to the target image quality parameter to obtain a target image in the target image format comprises:

decoding the source image into original pixel data; and re-encoding the original pixel data according to the target image quality parameter to obtain the target image in the target image format.

9. A computing device comprising one or more processors, memory coupled to the one or more processors and a plurality of programs stored in the memory that, when executed by the one or more processors, cause the computing device to perform a plurality of operations comprising:

obtaining a source image quality parameter of a source image, the source image being a to-be-transcoded image, and the source image quality parameter being associated with a source image format and used for indicating image quality of the source image;

obtaining, according to the source image quality parameter and a preset mapping relationship between at least one quality parameter sample value of the source image format and a quality parameter of a target image quality parameter that is associated with a target image format and that corresponds to the source image quality parameter of the source image, further comprising:

searching the preset mapping relationship between the at least one quality parameter sample value of the source image format and the quality parameter of the target image format for a quality parameter sample value most approximate to the source image quality parameter of the source image; and using a quality parameter that is associated with the target image format and that corresponds to the quality parameter sample value as the target image quality parameter that is associated with the target image format and that corresponds to the source image quality parameter of the source image; and transcoding the source image in the source image format according to the target image quality parameter to obtain a target image in the target image format.

10. The computing device according to claim 9, wherein the obtaining a source image quality parameter of a source image comprises:

obtaining a quantization matrix of the source image; and comparing the quantization matrix of the source image with a preset standard quantization matrix, to obtain the source image quality parameter of the source image.

11. The computing device according to claim 10, wherein the comparing the quantization matrix of the source image with a preset standard quantization matrix, to obtain the source image quality parameter of the source image comprises:

obtaining a value of a coefficient of variation between the quantization matrix of the source image and the preset standard quantization matrix according to a ratio of each coefficient in the quantization matrix of the source image to a coefficient at a corresponding location in the standard quantization matrix; and normalizing the value of the coefficient of variation according to a preset normalization algorithm to obtain the source image quality parameter.

12. The computing device according to claim 9, wherein the searching the mapping relationship between the at least one quality parameter sample value of the source image format and the quality parameter of the target image format further comprises:

using each quality parameter sample value as a target quality parameter sample value, and respectively transcoding a source image of the target quality parameter sample value by using a plurality of different transcoding quality parameters, to obtain a plurality of transcoded images that is in the target image format and that corresponds to the plurality of different transcoding quality parameters;

comparing each transcoded image with the source image of the target quality parameter sample value, and selecting, from the plurality of transcoded images, a transcoded image whose image quality satisfies a preset quality requirement and image data volume is minimum; and using a transcoding quality parameter corresponding to the transcoded image whose image quality satisfies the preset quality requirement and image data volume is minimum as a quality parameter that is associated with the target image format and that corresponds to the target quality parameter sample value.

13. The computing device according to claim 9, wherein the obtaining a source image quality parameter of a source image comprises:

obtaining the source image quality parameter of the source image according to a quantization parameter of each pixel macroblock in the source image.

14. The computing device according to claim 9, wherein the preset mapping relationship is a mapping formula used for calculating the target image quality parameter of the target image format according to the source image quality parameter of the source image; and the obtaining, according to the source image quality parameter and a preset mapping relationship, a target image quality parameter that is associated with a target image format and that corresponds to the source image quality parameter of the source image comprises:

substituting the source image quality parameter into the mapping formula, to calculate the target image quality parameter that is associated with the target image format and that corresponds to the source image quality parameter of the source image.

15. The computing device according to claim 14, wherein the plurality of operations further comprise:

before obtaining a source image quality parameter of a source image:

training the mapping formula by using quality parameters of a plurality of transcoded images in the target image format and source image quality parameters that are of source images and that correspond to the quality parameters as training parameters, so that the trained mapping formula is approximate to a correspondence between the quality parameters of the plurality of transcoded images and the source image quality parameters that are of the source images and that correspond to the quality parameters.

16. The computing device according to claim 9, wherein the transcoding the source image according to the target image quality parameter to obtain a target image in the target image format comprises:

decoding the source image into original pixel data; and re-encoding the original pixel data according to the target image quality parameter to obtain the target image in the target image format.

17. A non-transitory computer readable storage medium storing a plurality of machine readable instructions in connection with a computing device having one or more processors, wherein the plurality of machine readable instructions, when executed by the one or more processors, cause the terminal to perform a plurality of operations including:

obtaining a source image quality parameter of a source image, the source image being a to-be-transcoded image, and the source image quality parameter being associated with a source image format and used for indicating image quality of the source image;

obtaining, according to the source image quality parameter and a preset mapping relationship between at least one quality parameter sample value of the source image format and a quality parameter of a target image quality parameter that is associated with a target image format and that corresponds to the source image quality parameter of the source image, further comprising:

searching the preset mapping relationship between the at least one quality parameter sample value of the source image format and the quality parameter of the target image format for a quality parameter sample value most approximate to the source image quality parameter of the source image; and using a quality parameter that is associated with the target image format and that corresponds to the quality parameter sample value as the target image quality parameter that is associated with the target image format and that corresponds to the source image quality parameter of the source image; and transcoding the source image in the source image format according to the target image quality parameter to obtain a target image in the target image format.

18. The non-transitory computer readable storage medium according to claim 17, wherein the obtaining a source image quality parameter of a source image comprises:

obtaining a quantization matrix of the source image; and comparing the quantization matrix of the source image with a preset standard quantization matrix, to obtain the source image quality parameter of the source image.

* * * * *